May 22, 1951     O. SUTTLES     2,553,881
VENTILATING SYSTEM FOR HOUSE TRAILERS
Filed Jan. 15, 1948     2 Sheets-Sheet 1
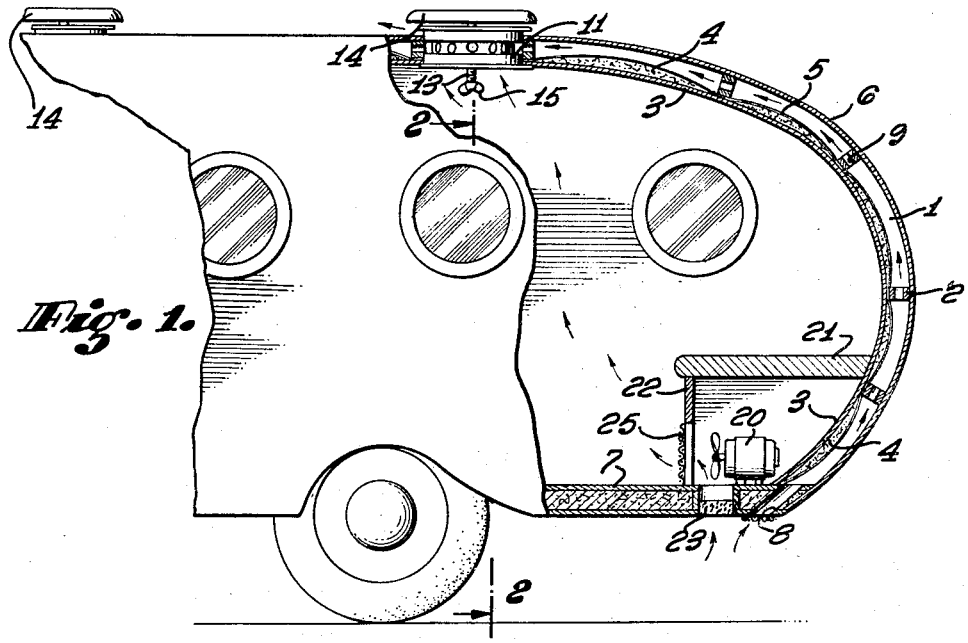
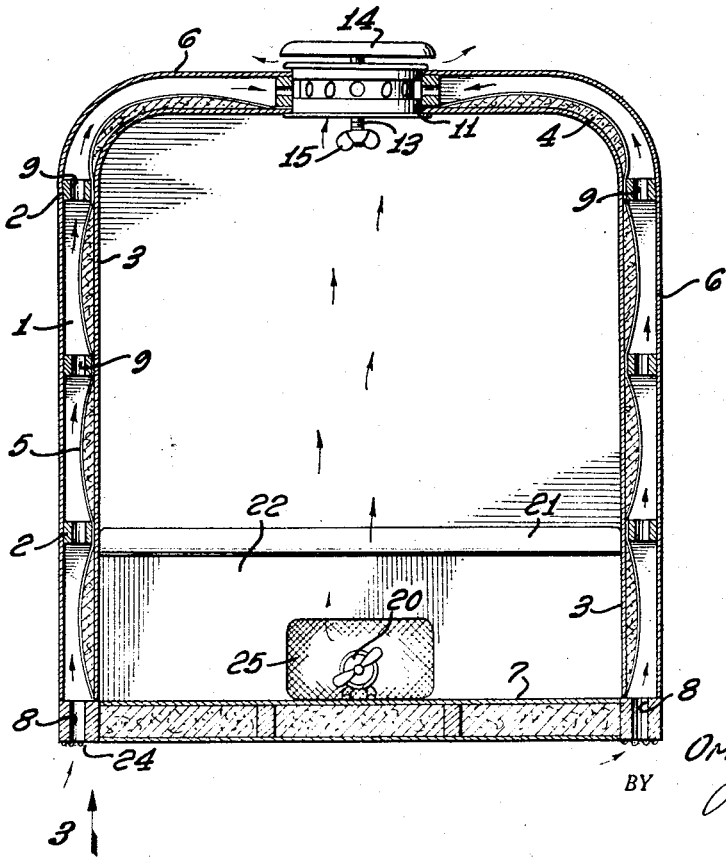
INVENTOR:
OMAR SUTTLES,
BY
O. Martin
ATTORNEY May 22, 1951     O. SUTTLES     2,553,881
VENTILATING SYSTEM FOR HOUSE TRAILERS
Filed Jan. 15, 1948     2 Sheets-Sheet 2
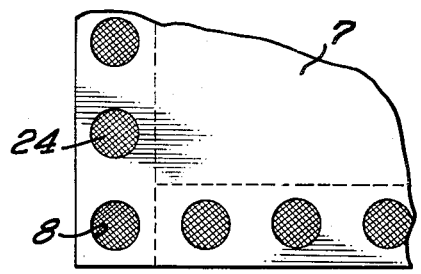
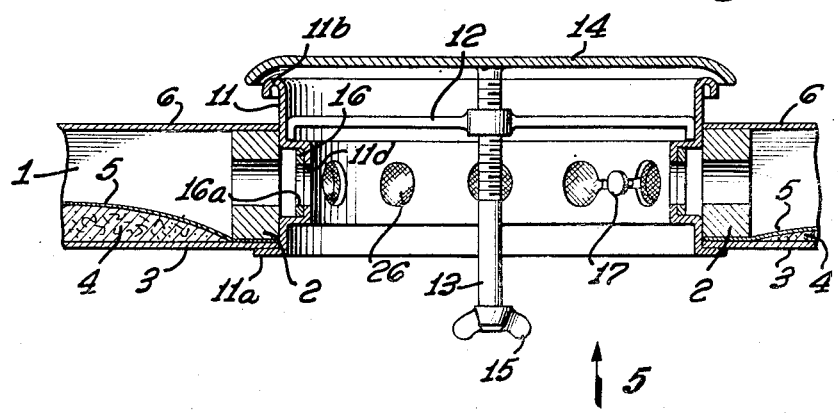
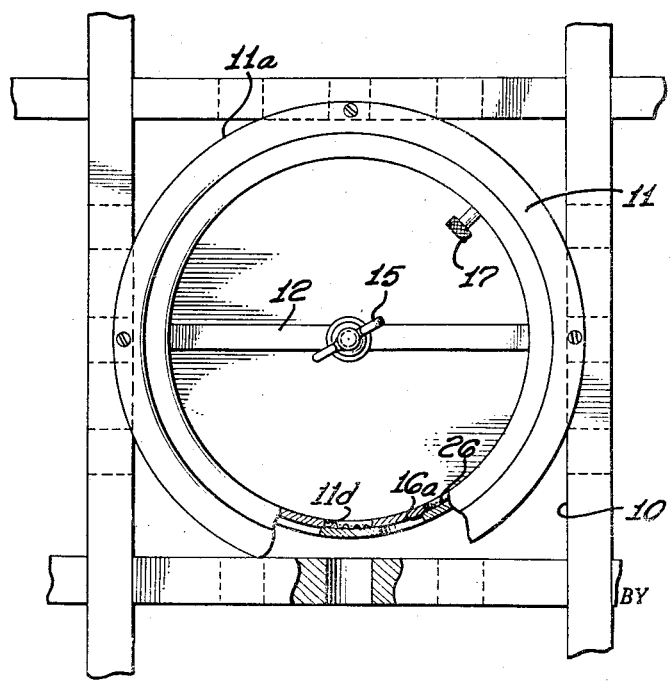
INVENTOR:
OMAR SUTTLES,
O. O. Martin
ATTORNEY.

Patented May 22, 1951

2,553,881

UNITED STATES PATENT OFFICE 2,553,881

VENTILATING SYSTEM FOR HOUSE TRAILERS

Omar Suttles, Los Angeles, Calif.

Application January 15, 1948, Serial No. 2,523

5 Claims. (Cl. 98—2)

1

This invention has relation to house trailers and more particularly to improved ventilating and air-conditioning, means for such trailers.

It is the general object of the invention to provide means for circulating air through the space within the inner and outer members of the walls of the trailer from the bottom thereof and out through vents in the trailer roof. It is a further object to heat insulate the spaces within the walls of the trailer. Another object is to apply such insulation to the inner member of the wall and to cover the insulation with a heat reflecting sheeting. A still further object of the invention is to provide improved types of vents for carrying off the air circulated through the wall spaces of the trailer. These and other objects of the invention, as well as the many advantageous features thereof, will be better understood upon perusal of the following detail description and by referring to the accompanying drawings, of which:

Fig. 1 is an elevational view of the rear end of a house trailer with part of the near wall thereof broken away in order to disclose the interior thereof as well as the wall construction;

Fig. 2 is a cross-sectional end view of the trailer taken substantially on line 2—2 of Fig. 1, in the direction of the arrow;

Fig. 3 is a fragmentary view of a corner of the trailer floor taken in the direction of the arrow 3 of Fig. 2;

Fig. 4 is a cross-sectional elevational view of one of the vents of the trailer; and Fig. 5 is a plan view of the vent taken in the direction of the arrow 5 of Fig. 4.

The framing of the trailer walls consists of parallel rows of studs 1, such as used in the wall framing of the ordinary dwelling house, and these studs are reinforced by means of rows of horizontal braces 2. The inner sheeting 3 is fastened to the studs and braces in any convenient conventional manner, whereupon suitable insulating material 4, such as spun glass or the like, is placed against the outer surface of the inner sheeting 3 and it is covered and retained in position thereagainst by means of a sheet 5 of impregnated paper or other suitable water resistant material. To the outer or both surfaces of the cover material 5 is applied silvery metal foil, whereupon the outer sheeting 6 of the wall is secured to the wall framing in any conventional manner.

2

The framing of the floor 7 may be similar to the wall framing and the spaces between the upper and lower sheetings thereof are preferably completely filled with similar heat insulating material.

The floor of the trailer is, along the entire perimeter thereof, made with perforations 8 which form passages for air from below the frame to pass through the wall spaces above the trailer floor and similar passages 9 are provided in the braces 2 for the purpose of circulating air from below the trailer through all of these passages and out through vents in the top thereof. It was above stated that the sheeting 5, which covers the insulating material 4 within the wall spaces, is coated with a heat reflecting substance and this is done in order to cause the air circulating upwardly through the wall spaces to absorb and carry with it any heat which may have been absorbed from the outer sheeting 6. With the walls of the trailer constructed in the above described manner, it is found that little heat reaches the inner sheeting 3 of the walls and that the temperature within the trailer may, in hot weather, be maintained several degrees cooler than the outside temperature.

One or more circular openings 10 are cut through the roof of the trailer and an annular frame 11 is seated in each of these openings. This frame is for convenient installation made with a bottom flange 11$^a$ and it rises a distance above the roof of the trailer, terminating at the top inwardly and outwardly curved flange 11$^b$. A brace 12 extends diametrically across the space within the frame 11, near the top thereof. The center portion of this brace is enlarged to form a boss having a threaded perforation vertically extending therethrough and a stem 13 is made with screw threads seated in the threads of this boss. To the upper end of this stem is secured a circular cap 14, the peripheral edge of which is curved downward to fit over the flange 11$^b$ of the circular frame 11 when the stem is manipulated to seat the cap thereon. A handle 15 is secured to the lower end of this stem for the purpose of such manipulation. The center portion of the frame is made with a circular recess 11$^c$ within which an annular band 16 is seated to slide and it is noticed that the recessed portion of the frame as well as the band 16 are made with endless series of equidistantly spaced perforations 11ᵈ, 16ª, which may be brought into mutual registration upon rotation of the band on the frame. The band is, for the purpose of such rotation, fitted with a forwardly projecting handle 17 and the wall of the frame 11 is cut away between two adjacent perforations thereof to form a passage for this handle substantially as indicated in Fig. 4.

House trailers are usually maintained tightly closed while the vehicle is in motion and when, during travelling, the cap 14 is kept closed, it is seen that no air is circulated through the walls. When the vent in the roof is open it is in warm weather found that air will rise through the spaces within this side wall of the trailer and pass out through the open vents. In addition it is required to provide circulation through the interior of the trailer and this may be done by placing on the floor, in a convenient position, an electric fan 20. Every available space within a vehicle of this type is put to use by placing therein cupboards, closets or seats, and the fan above referred to is conveniently placed within such equipment as, for example, the seat 21 illustrated in Fig. 1. An opening is cut through the front support 22 of this seat and a passage leads from the bottom of the trailer into the space within the seat structure surrounding the fan. An air filter 23, of any commercially well known construction, is placed in this opening. When the fan is in operation, it is seen that filtered air is caused to circulate through the interior of the trailer and to discharge through the vents at the top thereof.

If desired, additional air circulating fans may be placed within the trailer at any convenient locations therein. This air circulation, together with the circulation through the side walls of the trailer, will maintain the interior of the vehicle cool and comfortable under all conditions, and it is important to note that all entrance passages to the circulating system of the vehicle are placed below the floor thereof. As shown in Figs. 2 and 3, these entrance passages are fitted with screens 24, 25 to prevent insects and other undesirable objects from entering the circulating system. Similar screens 26 may also be placed between the band 16 and the inner wall of the framing 11, as indicated in Fig. 4.

While I have described and illustrated a preferred form of the invention, it is not meant thereby to limit the invention to the combinations shown, but right is reserved to embody modifications within the scope of the claims hereto appended.

I claim:

1. A ventilating system for a trailer having studs rising from the floor thereof and horizontal braces therebetween, there being air passages through said braces, the studs and braces extending over the top of the trailer to form the roof thereof, parallel outer and inner wall and roof members fastened to said studs and braces, there being air passages rising through the floor and communicating with the air spaces between said wall and roof members, there being circular passages through the trailer roof members, an annular flange rising through and tightly seated in each of said roof member passags, said flanges having perforations therethrough communicating with the said air spaces, and an annular band fitted for rotation on said frame, the band having perforations therethrough for registration with said flange perforations.

2. A ventilating system for a trailer having studs rising from the floor thereof and horizontal braces therebetween, there being air passages through said braces, the studs and braces extending over the top of the trailer to form the roof thereof, parallel outer and inner wall and roof members fastened to said studs and braces, there being air passages rising through the floor and communicating with the air spaces between said wall members, there being circular passages through the trailer roof members, an annular flange rising through and tightly seated in each of said roof member passages, said flanges having perforations therethrough communicating with said wall member air spaces, an annular band fitted for rotation on each of said flanges, said band having perforations therethrough for registration with said flange perforations, a cover for each flange, and means for opening and closing said cover.

3. A ventilating system for a trailer having studs rising from the floor thereof and horizontal braces therebetween, there being air passage through said braces, the studs and braces extending over the top of the trailer to form the roof thereof, parallel outer and inner wall and roof members fastened to said studs and braces, there being air passages rising through the floor and communicating with the air spaces between said wall members, there being circular passages through the trailer roof members, an annular flange rising through and tightly seated in each of said roof member passages, said flanges having each an annular recess in the surface thereof and perforations through said recess communicating with said air spaces, and a shutter seated within each of said recesses and movable to disrupt communication with the said air spaces.

4. In a trailer having parallel double wall and roof members and made with passages rising through the floor thereof into the spaces between the wall and roof members, there being circular passages through the roof members, an annular flange tightly seated in and rising above each roof passage, said flanges having passages therethrough communicating with said air spaces and having their upper edges outwardly flared, an annular shutter member seated in and rotatble within said flange to control said flange passages, a cross brace in each flange having a central threaded perforation, an operating rod seated in the threads of each brace, and a cover secured to the upper end of each rod, the circular edge of said cover being downwardly curved to fit over the flared upper edge of the flange when the cover is closed.

5. In a trailer having parallel double wall and roof members and made with passages rising through the floor thereof into the spaces between the wall and roof members, there being circular passages through the roof members, an annular flange tightly seated in and rising above each roof passage, said flanges having passages therethrough communicating with said air spaces and having their upper edges outwardly flared, a circular sleeve seated for rotation on each of said flanges and having perforations therethrough for registration with said flange passages, said sleeve having an inwardly projecting operating handle, a cross brace in each flange having a central threaded perforation, an operating rod seated in the threads of each brace, and a cover secured to the upper end of each rod, the circular edge of said cover being downwardly curved to fit over the flared upper edge of the flange when the cover is closed.

OMAR SUTTLES.

REFERENCES CITED

The following references are of record in the file of this patent:

UNITED STATES PATENTS

| Number | Name | Date |
|---|---|---|
| Re. 13,239 | Lindemeyer | May 9, 1911 |
| 778,204 | Porter | Dec. 20, 1904 |
| 884,404 | Morris | Apr. 14, 1908 |
| 1,512,754 | Gabor | Oct. 21, 1924 |
| 1,623,383 | Burkholder | Apr. 5, 1927 |
| 1,915,380 | Peterson et al. | June 27, 1933 |
| 2,013,601 | Clark | Sept. 3, 1935 |
| 2,103,843 | Fillion | Dec. 28, 1937 |
| 2,294,363 | Brockway | Sept. 1, 1942 |
| 2,326,318 | Anderson | Aug. 10, 1943 |

FOREIGN PATENTS

| Number | Country | Date |
|---|---|---|
| 342,217 | Germany | Oct. 14, 1921 |
| 602,489 | France | Dec. 28, 1925 |